(12) United States Patent
Nakamura et al.

(10) Patent No.: US 11,274,222 B2
(45) Date of Patent: Mar. 15, 2022

(54) INK, INK ACCOMMODATING CONTAINER, RECORDING DEVICE, AND RECORDING METHOD

(71) Applicant: RICOH COMPANY LTD., Tokyo (JP)

(72) Inventors: Yuta Nakamura, Kanagawa (JP); Naoto Shimura, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 16/820,764

(22) Filed: Mar. 17, 2020

(65) Prior Publication Data
US 2020/0299531 A1 Sep. 24, 2020

(30) Foreign Application Priority Data
Mar. 18, 2019 (JP) .............................. JP2019-049370

(51) Int. Cl.
*C09D 11/38* (2014.01)
*B41M 5/00* (2006.01)
(Continued)

(52) U.S. Cl.
CPC .............. *C09D 11/38* (2013.01); *B41J 2/2107* (2013.01); *B41M 5/0023* (2013.01); *C09D 11/102* (2013.01); *C09D 11/324* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 25/001; B41J 25/34; B41J 25/003; B41J 25/312; B41J 2025/008; B41J 2202/21; B41J 2/17596; B41J 2/16508;
(Continued)

(56) References Cited
U.S. PATENT DOCUMENTS

2001/0001103 A1 * 5/2001 Noguchi ................ C09D 11/30
528/71
2003/0105187 A1 * 6/2003 Iijima .................. C09D 11/322
523/160
(Continued)

FOREIGN PATENT DOCUMENTS

JP     2006-070123    3/2006
JP     2008-031260    2/2008
(Continued)

OTHER PUBLICATIONS

U.S. Appl. No. 16/583,905, filed Sep. 26, 2019, Yuta Nakamura, et al.

*Primary Examiner* — Manish S Shah
(74) *Attorney, Agent, or Firm* — Grünenberg and Myers PLLC (57) ABSTRACT

An ink contains a coloring material, a urethane resin, diethylene glycol diethyl ether, and a siloxane compound, wherein diethylene glycol diethyl ether has a proportion of 6.0 percent or greater by mass of the total amount of the ink.

15 Claims, 1 Drawing Sheet

(51) Int. Cl.
*C09D 11/102* (2014.01)
*C09D 11/324* (2014.01)
*B41J 2/21* (2006.01)

(58) Field of Classification Search
CPC ...... B41J 2/1652; B41J 2/16538; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2010/0026743 A1* | 2/2010 | Van Thillo | B41J 2/01 347/9 |
| 2011/0178214 A1* | 7/2011 | Tsukiana | C09D 11/322 524/107 |
| 2011/0234727 A1* | 9/2011 | Aoki | B41M 5/0011 347/102 |
| 2013/0002776 A1* | 1/2013 | Nagashima | C09D 11/328 347/100 |
| 2013/0176369 A1* | 7/2013 | Gotou | B41J 2/2107 347/100 |
| 2015/0116433 A1* | 4/2015 | Fujii | B41J 11/0021 347/102 |
| 2015/0138284 A1* | 5/2015 | Nagashima | C09D 11/322 347/86 |
| 2017/0022380 A1* | 1/2017 | Nakagawa | B41J 2/2114 |
| 2017/0051170 A1* | 2/2017 | Nakagawa | B41M 7/009 |
| 2017/0174919 A1 | 6/2017 | Kido et al. | |
| 2017/0335123 A1 | 11/2017 | Nakamura et al. | |
| 2018/0001669 A1 | 1/2018 | Furukawa et al. | |
| 2018/0127610 A1 | 5/2018 | Kido et al. | |
| 2018/0170061 A1 | 6/2018 | Nakamura et al. | |
| 2018/0208783 A1 | 7/2018 | Takahashi et al. | |
| 2019/0270900 A1 | 9/2019 | Nakamura et al. | |
| 2019/0283406 A1 | 9/2019 | Fujita et al. | |
| 2019/0345356 A1 | 11/2019 | Kido et al. | |

FOREIGN PATENT DOCUMENTS

| | | |
|---|---|---|
| JP | 2009-235155 | 10/2009 |
| JP | 2009-249578 | 10/2009 |
| JP | 2011-178981 | 9/2011 |
| JP | 2017-115127 | 6/2017 |
| JP | 2017-119810 | 7/2017 |

* cited by examiner

INK, INK ACCOMMODATING CONTAINER, RECORDING DEVICE, AND RECORDING METHOD

CROSS-REFERENCE TO RELATED APPLICATIONS

This patent application is based on and claims priority pursuant to 35 U.S.C. § 119 to Japanese Patent Application No. 2019-049370, filed on Mar. 18, 2019, in the Japan Patent Office, the entire disclosure of which is hereby incorporated by reference herein.

BACKGROUND

Technical Field

The present invention relates to an ink, an ink accommodating container, a recording device, and a recording method.

Description of the Related Art

Since inkjet recording devices are relatively quiet, enjoy low running costs, and are capable of easily printing color images, they are now widely used at home as an output device of digital signals. In recent years, inkjet technologies have been appealing in commercial applications and industrial applications in addition to home use. In commercial and industrial applications, the image quality equivalent to that of typical offset printing is demanded for printing on recording media such as coated paper having low ink absorbing property and non-ink-absorbing plastic media by an inkjet recording method.

SUMMARY

According to embodiments of the present disclosure, provided is an ink which contains a coloring material, a urethane resin, diethylene glycol diethyl ether, and a siloxane compound, wherein diethylene glycol diethyl ether has a proportion of 6.0 percent or greater by mass of the total amount of the ink.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An ink containing a pigment liquid dispersion, a polysiloxane surfactant, polyurethane resin particles, dipropylene glycol monomethyl ether has been proposed in Examples of JP-2017-115127-A1.

According to the present disclosure, an ink can be provided with which an image having excellent anti-beading property and attachability is obtained.

Next, one embodiments of the present disclosure is described.

Ink

The ink of the present embodiment contains an organic solvent, a coloring material, a resin, etc. In addition, the ink can optionally contain water and other additives.

Organic Solvent

The ink of the present embodiment contains diethylene glycol diethyl ether and may optionally contain the compound represented by Chemical formula 1 and other organic solvents.

Diethylene Glycol Diethyl Ether

The ink contains diethylene glycol diethyl ether. The proportion of diethylene glycol diethyl ether is 6.0 percent or greater by mass of the total amount of the ink. Beading properties and adhesion of an image formed with the ink can be improved within the range specified above of diethylene glycol diethyl ether. Note that beading refers to image unevenness ascribable to insufficient drying of the ink, etc. Images with less image unevenness are preferable. The proportion of diethylene glycol diethyl ether of the total amount of the ink is from 6.0 to 20.0 percent by mass and more preferably from 6.0 to 10.0 percent by mass. Within this range, the dispersion stability of the ink is improved.

Compound Represented by Chemical Formula 1

The ink preferably contains a compound represented by the following Chemical formula 1. Inclusion of the compound represented by Chemical formula 1 in the ink enhances the anti-beading property of the ink even when a non-permeable recording medium is used as the recording medium to which the ink is applied.

Chemical formula 1

In Chemical formula 1, $R_1$, $R_2$, and $R_3$ each independently represent hydrocarbon groups having one to eight carbon atoms.

Specific examples include, but are not limited to, 3-methoxy-N,N-dimethyl propionamide and 3-butoxy-N,N-dimethyl propionamide.

The proportion of the compound represented by the Chemical formula 1 is preferably from 0.5 to 20.0 percent by mass, more preferably from 1.0 to 10.0 percent by mass, and furthermore preferably from 3.0 to 10.0 percent by mass of the total content of the ink.

Other Organic Solvent

The ink may contain other organic solvents in addition to the above-mentioned diethylene glycol diethyl ether and the compound represented by Chemical formula 1. Other organic solvents are not particularly limited. A liquid organic solvent can be suitably used at 25 degrees C. and 1 atm. Examples include, but are not limited to, polyhydric alcohols, ethers such as polyhydric alcohol alkyl ethers and polyhydric alcohol aryl ethers, nitrogen-containing heterocyclic compounds, amides, amines, and sulfur-containing compounds.

Specific examples of the organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, di ethylene glycol monoethylether, di ethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide and N-methylformamide, N,N-dimethylformamide; amines such as monoethanolamine, diethanolamine, and triethylamine; sulfur-containing compounds such as dimethyl sulfoxide, sulfolane, and thiodiethanol; propylene carbonate, and ethylene carbonate.

Polyol compounds having eight or more carbon atoms and glycol ether compounds are also suitable as the organic solvents.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzyl ether.

The polyol compounds having eight or more carbon atoms and glycolether compounds enhance permeability of ink for paper used as a print medium (recording medium).

The proportion of the organic solvent of the ink has no particular limit and can be suitably selected to suit to a particular application.

In terms of drying property and discharging reliability of ink, the proportion is preferably from 10.0 to 60.0 percent by mass and more preferably from 20.0 to 60.0 percent by mass.

Resin

The ink of the present embodiment contains a urethane resin and may optionally contain resins other than the urethane resin.

Urethane Resin

The ink contains a urethane resin. Inclusion of the urethane resin enhances image gloss, scratch resistance, and attachability to an image formed with the ink. In order to further improve these properties, the urethane resin is preferably used in the form of urethane resin particles in the ink. As the polyurethane resin, polyether-based polyurethane resin, polycarbonate-based polyurethane resin, and polyester-based polyurethane resin are preferable.

As the urethane resin, a manufactured product or a commercially available product may be used. Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.). These can be used alone or in combination.

The proportion of the urethane resin is not particularly limited, but is preferably 12.0 percent by mass or less and more preferably 9.0 percent by mass or less of the total amount of the ink in terms of enhancing dispersibility. The proportion is preferably 8 percent by mass or less to obtain an image having high level of gloss and image gloss. Further, in terms of enhancing the scratch resistance of an image formed with the ink, the proportion of the urethane resin is preferably set to 5.0 percent or greater by mass of the total amount of the ink.

Various Materials Used for Manufacturing Urethane Resin

The urethane resin can be obtained by reacting a polyol with a polyisocyanate, etc.

Polyol

Examples of the polyol include, but are not limited to, polyether polyols, polycarbonate polyols, and polyester polyols. These can be used alone or in combination.

The urethane resin is preferably a polycarbonate-based urethane resin obtained by using a polycarbonate polyol. Since the carbonate group has high cohesion ability, the ink containing the polycarbonate-based urethane resin has excellent water resistance, heat resistance, abrasion resistance, weather resistance, and scratch resistance. Therefore, an ink containing a polycarbonate-based urethane resin is suitable in a severe environment such as an outdoor use.

An example of the polyether polyol can be obtained by subjecting at least one compound having two or more active hydrogen atoms as a starting material to addition polymerization with alkylene oxide.

Specific examples of the compound having two or more active hydrogen atoms include, but are not limited to, ethylene glycol, diethylene glycol, triethylene glycol, propylene glycol, trimethylene glycol, 1,3-butanediol, 1,4-butanediol, and 1,6-hexanediol, glycerin, trimethylolethane, and trimethylolpropane. These can be used alone or in combination.

Examples of the alkylene oxide include, but are not limited to, ethylene oxide, propylene oxide, butylene oxide, styrene oxide, epichlorohydrin, and tetrahydrofuran. These can be used alone or in combination.

In addition, specifically, polyoxy tetramethylene glycol, polyoxy propylene glycol are preferable as the polyether polyol. By using these, it is possible to obtain a urethane resin as an ink binder capable of imparting excellent scratch resistance.

As the polycarbonate polyol, for example, a product obtained by reacting a carboxylic acid ester with a polyol or a phosgene with bisphenol A, etc. These can be used alone or in combination.

Specific examples of the carboxylic acid ester include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol A, bisphenol F, and 4,4'-biphenol; polyether polyols such as polyethylene glycol, polypropylene glycol, and polyoxytetramethylene glycol; and polyester polyols such as polyhexamethylene adipate, polyhexamethylene succinate, and polycaprolactone. These can be used alone or in combination.

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a copolymerized polyester of these. These can be used alone or in combination.

Specific examples of the polyol having a low molecular weight include, but are not limited to, ethylene glycol and propylene glycol. These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate, and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethylhexamethylene diisocyanate. These can be used alone or in combination. Of these, it is preferable to use an alicyclic diisocyanate in terms that an image having a long-term weather resistance can be formed when the ink is used for outdoor use such as a poster or a signboard. Also, the strength of an image can be enhanced and excellent scratch resistance can be obtained with an alicyclic diisocyanate.

Specific examples of the alicyclic diisocyanate include, but are not limited to, isophorone diisocyanate, and dicyclohexylmethane diisocyanate. The proportion of the alicyclic diisocyanate is preferably 60.0 percent or greater by mass of the total content of the isocyanate compound.

Method for Manufacturing Urethane Resin

The urethane resin can be manufactured by typical manufacturing methods. For example, the following method is suitable.

First, a urethane prepolymer having an isocyanate group at a terminal is prepared under the presence of no solvent or an organic solvent through the reaction of the polyol and the polyisocyanate with an equivalent ratio in which isocyanate groups are excessive. Next, optionally, the anionic group in the urethane prepolymer having an isocyanate group at a terminal is neutralized by a neutralizer. Subsequent to reaction with a chain elongating agent, the system is optionally purged of the organic solvent to obtain the urethane resin particle.

Organic Solvent

Specific examples of the organic solvent for use in manufacturing the urethane resin include, but are not limited to, ketones such as acetone and methylethyl ketone, ethers such as tetrahydrofuran and dioxane, acetic acid esters such as ethyl acetate and butylacetate, nitriles such as acetonitrile, and amides such as dimethyl formamide, N-methyl pyrrolidone, and N-ethyl pyrrolidone. These can be used alone or in combination.

Chain Elongating Agent

Polyamines or other compounds having an active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines such as hydradine, N,N'-dimethyl hydrazine, and 1,6-hexamethylene bis hydrazine, and dihydrazides such as succinic acid dihydrazide, adipic acid dihydrazide, glutaric acid dihydrazide, sebacic acid dihydrazide, and isophthalic acid dihydrazide. These can be used alone or in combination.

Specific examples of the other compounds having active hydrogen groups include, but are not limited to, glycols such as ethylene glycol, diethylene glycol, triethylene glycol, propylene glycol, 1,3-propane diol, 1,3-butanediol, 1,4-butanediol, hexamethylene glycol, saccharose, methylene glycol, glycerin, and sorbitol, phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of ink.

Status of Urethane Resin

As described above, the urethane resin is preferably present in the form of urethane resin particles in the ink. The ink is preferably present in the form of a resin emulsion dispersed in water as a dispersion medium and obtained by mixing with materials such as a coloring material and an organic solvent to obtain the ink. The ease of work and the uniform dispersibility are enhanced by mixing an organic solvent, a coloring material, water, etc., in the state of a resin emulsion to prepare an ink.

The urethane resin particles are dissolved in an organic solvent added to the organic solvent to form a filmy recording layer (image). That is, the evaporation of water from the ink after the application of the ink promotes the film formation of the urethane resin particles. Therefore, it is possible to obviate the need for heating in the recording depending on the type of the urethane resin particles.

The method of dispersing urethane resin particles in water is not particularly limited. It is suitable to utilize a method of using self-emulsifying resin particles having an anionic group in a molecular structure, a forced emulsifying resin particle using a dispersant, etc. Of these, in terms of enhancing strength of recorded matter, the method of using self-emulsifying resin particles having an aniline group in its molecular structure is preferable.

The acid value of the anionic group when the self-emulsifying urethane resin particles are used is preferably from 5 to 100 mgKOH/g and more preferably from 5 to 50 mgKOH/g in terms of water dispersibility, scratch resistance, and chemical resistance.

Specific examples of the anionic group include, but are not limited to, a carboxyl group, a carboxylate group, a sulfonic acid group, and a sulfonate group. Of these, a carboxylate group or a sulfonate group which is partially or entirely neutralized by a basic compound, etc. is preferable to maintain good water dispersion stability. To introduce an anionic group into a resin, it is suitable to use a monomer having such an anionic group.

Further, the anionic group is preferably neutralized by a basic compound. Specific examples of the basic compound include, but are not limited to, organic amines such as ammonium, triethyl amine, pyridine, and morpholine, alkanol amine such as monoethanol amine, and metal salt compounds containing Na. K. Li, Ca, etc. These can be used alone or in combination.

To manufacture a water dispersion using the forced emulsifying urethane resin particle, it is possible to utilize a method using a surfactant such as a nonionic surfactant and an anionic surfactant. These can be used alone or in combination. Of these, nonionic surfactants are preferred in terms of water resistance.

Specific examples of the nonionic surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene sorbitan aliphatic acid ester, poly oxyethylene curable ricinus, polyoxyalkylene polycyclic phenylether, polyoxyethylene alkylamine, alkylalkanolamide, and polyalkylene glycol (meth)acrylate. Of these, polyoxyethylene alkyl ether, polyoxyethylene aliphatic acid esters, polyoxyethylene sorbitan aliphatic acid ester, and polyoxyethylene alkylamine are preferable. These can be used alone or in combination.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. Of these, polyoxyethylene alkylether sulfuric acid salts and sulfosuccinic salts are preferable.

When a water dispersion is manufactured using the forced emulsifying urethane resin particle, the proportion of the surfactant is not particularly limited and can be suitably selected to suit to a particular application. For example, it is preferably from 0.1 to 30 percent by mass and more preferably from 5 to 20 percent by mass of the total content of the forced emulsifying urethane resin particle. When the proportion is within the range of from 0.1 to 30 percent by mass, the urethane resin particles suitably form a film so that ink having excellent attachability and water resistance is obtained and can be suitably used to form recorded matter.

Various Properties of Urethane Resin

The volume average particle diameter of the urethane resin particle is preferably from 10 to 1,000 nm, more preferably from 10 to 500 nm, and furthermore preferably from 10 to 200 nm taking it into account that the ink is used in an inkjet recording device. When the volume average particle diameter is from 10 to 1,000 nm, the contact portions between the organic solvent and the surface of the urethane resin particle increase so that the film-forming property of the urethane resin particle is improved, thereby forming a continuous film of a robust resin. As a result, tough recorded matter can be obtained. The volume average particle diameter can be measured by using a particle size analyzer (Microtrac MODEL UPA 9340, manufactured by Nikkiso Co., Ltd.), etc.

The qualitative and quantitative properties of the resin can be checked according to the detailed processes described in "Test Method and Evaluation Result of Each Dynamic Property of Plastic Material (22)", Authored by TAKEO Yasuda, JOURNAL OF THE JAPAN PLASTICS INDUSTRY FEDERATION, "Plastics" Edited by Edition Committee. Specifically, infrared spectroscopy (IR), heat analysis such as differential scanning calorimetry (DSC) and thermogravimeter-differential thermal analyzer (TG/DTA), pyrolysis gas chromatography (PyGC), and nuclear magnetic resonance (NMR) are used for analysis.

The glass transition temperature of the urethane resin can be measured by a differential scanning calorimeter (for example, DSC6200, manufactured by SEIKO ELECTRONICS INDUSTRIAL CO., LTD.). Specifically, the resin particle is subject to the following continuous temperature programs of 1 to 4 and the value obtained under the temperature program 3 is determined as the glass transition temperature. The value obtained under the temperature program 3 is used to secure reproducibility of the measuring results.

Temperature Programs 1. 30 to 250 degrees C.: Temperature rising speed 30 degrees C./min, maintained for one minute
2. 250 degrees C. or higher to −100 degrees C. or lower: Temperature falling speed 30 degrees C./min, maintained for 30 minutes
3. −100 to 250 degrees C.: Temperature rising speed 5 degrees C./min, maintained for one minute
4. 250 degrees C. or higher to 30 degrees C. or lower: Temperature falling speed 30 degrees C./min, maintained for two minutes The minimum film forming temperature (hereinafter, also referred to as MFT) of the urethane resin is not particularly limited. In particular, if the minimum film-forming temperature is higher than 80 degrees C., heating the ink after the application thereof is preferable because image robustness can be improved without defective film-forming of the resin.

The minimum film-forming temperature can be adjusted by controlling the glass transition temperature (hereinafter, also referred to as Tg) of the urethane resin. When the urethane resin is a copolymer, it can be adjusted by changing the ratio of the monomers forming the copolymer. The minimum film forming temperature is the lowest temperature below which transparent continuous film is not formed when the urethane resin is extended and flown on a metal plate made of such as aluminum while the temperature is raised. At temperatures lower than the lowest layer forming temperature, the emulsion becomes white powder. The minimum layer forming temperature can be measured by using a minimum film forming temperature measuring instrument available on the market such as "film-forming temperature tester" (manufactured by IMOTO MACHINERY CO., LTD.) and "TP-801 MFT tester" (manufactured by TESTER SANGYO CO., LTD.). In addition, since the minimum film forming temperature varies depending on the volume average particle diameter of the resin particle, it is possible to acquire the target MFT of the resin particle due to the control factor of the volume average particle diameter of the resin.

Siloxane Compound

The ink of the present embodiment contains a siloxane compound. Inclusion of a siloxane compound enhances anti-beading property of an image formed with the ink. Further, the siloxane compound is preferably used as a siloxane surfactant. The case where a siloxane compound is used as a siloxane surfactant will be described below.

Examples include, but are not limited to, a compound (silicone-based compound) having a hydrophilic group or a hydrophilic polymer chain at a side chain of a compound having a polysiloxane backbone such as polydimethylsiloxane and a compound having a hydrophilic group or a hydrophilic polymer chain at a terminal of a compound (silicone-based compound) having a polysiloxane structure such as polydimethylsiloxane. The polysiloxane-based surfactant means a compound having a polysiloxane backbone in its structure.

Specific examples of the hydrophilic group and the hydrophilic polymer chain include, but are not limited to, polyether groups (polyethyleneoxide, polypropylene oxide, and copolymers thereof), polyglycerin ($C_3H_6O(CH_2CH(OH)CH_2O)_n$—H, etc.), pyrrolidone, betaine ($C_3H_6N^+(C_2H_4)_2$—$CH_2COO^-$, etc.), sulfates ($C_3H_6O(C_2H_4O)_n$—$SO_3Na$, etc.), phosphates ($C_3H_6O(C_2H_4O)_n$—$P(=O)OHONa$, etc.), and quaternary salts ($C_3H_6N^+(C_2H_4)_3Cl^-$, etc.). In the chemical formulae, n represents an integer of 1 and above. Of these, compounds having a polyether group are preferable. In addition, a vinyl-based copolymer is also preferable which has a silicone-based compound chain such as polydimethylsiloxane in its side chain. This is obtained by copolymerization of a polydimethylsiloxane having a polymerizable vinyl group at a terminal with a copolymerizable monomer (it is preferable to at least partially use a hydrophilic monomer such as a (meth)acrylic acid or its salt in the monomer). Of these, compounds having a polysiloxane backbone and a hydrophilic polymer chain are preferable. More preferred are compounds having a polyether group as the hydrophilic polymer chain. In addition, a nonionic surfactant is particularly preferable in which a polysiloxane surfactant has methylpolysiloxane as a hydrophobic group and a polyoxyethylene backbone as a hydrophilic group.

Examples of the siloxane surfactant are polyether-modified silicone and silicone compounds having a polyoxyalkylene group.

The siloxane surfactant is available on the market.

Specific example include, but are not limited to, Silface SAG005 and Silface SAG008, both are manufactured by Nisshin Chemical Co., Ltd., FZ2110, FZ2166, SH-3772M, L7001, SH-3773M, all of which are manufactured by Dow Corning Toray Co., Ltd., KF-353, KF-945, and KF-6017, both of which are manufactured by Shin-Etsu Chemical Co., Ltd., and FormBan MS-575, manufactured by Ultra Additives Inc.).

The proportion of the siloxane surfactant is preferably from 0.1 to 4.0 percent by mass and more preferably from 1.0 to 2.0 percent by mass of the total content of the ink. When the proportion is from 0.1 to 4.0 percent by mass and the siloxane surfactant is used in combination with diethylene glycol diether, anti-beading property of the ink to various non-permeable recording media can be improved and image quality such as gloss can be improved.

Further, the mass ratio of the content of diethylene glycol diethyl ether to the content of the siloxane compound (siloxane surfactant) is preferably from 1.0 to 15.0, more preferably from 2.7 to 10.0, and even more preferably from 5.0 to 6.0.

Coloring Material

The ink of the present embodiment contains a coloring material. The coloring material has no particular limit. For example, pigments and dyes are suitable. As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material of the ink is preferably from 0.1 to 15 percent by mass and more preferably from 1 to 10 percent by mass in terms of enhancement of image density, attachability, and discharging stability.

To obtain an ink by dispersing a pigment, it is possible to introduce a hydrophilic functional group into a pigment to prepare a self-dispersible pigment, coat the surface of a pigment with a resin followed by dispersion, use a dispersant to disperse a pigment, etc.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to the ink are not necessarily entirely coated with a resin. Pigments not or partially coated with a resin may be dispersed in the ink.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix it with a material such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Water

The ink of the present embodiment preferably contains water. The proportion of water of the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Additive

Ink may further optionally include a defoaming agent, a preservative and fungicide, a corrosion inhibitor, a pH regulator, etc.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7.

Specific examples include, but are not limited to, amines such as diethanol amine and triethanol amine.

Property of Ink

Properties of the ink are not particularly limited and can be suitably selected to suit to a particular application. For example, viscosity, surface tension, pH, etc., are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)

Sample liquid amount: 1.2 mL

Number of rotations: 50 rotations per minute (rpm)

25 degrees C.

Measuring time: three minutes.

The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal parts in contact with liquid.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

For example, plastic films such as vinyl chloride resin film, polyethylene terephthalate (PET) film, polypropylene film, polyethylene film, and polycarbonate film are suitably used as the non-permeable substrate.

Specific examples of the non-permeable substrate using polypropylene and polyethylene include, but are not limited to, AR1025, AR1056, AR1082, EC1082, 1082D, 1073D, 1056D, 1025D, FR1073 (manufactured by DuPont-Asahi Flash Spun Products Co., Ltd.), P2002, P2102, P2108, P2161, P2171, P2111, P4266, P5767, P3162, P6181, P8121, P1162, P1111, P1128, P1181, P1153, P1157, P1146, P1147, P1171 (manufactured by TOYOBO CO., LTD.), YPI, Aqua Yupo, Super Yupo, Ultra Yupo, New Yupo, YUPO Illuminated Paper, YUPO building material paper, YUPO High Gloss, YUPOJET, and Metallic YUPO (manufactured by YUPO Corporation).

Recorded Matter

The recorded matter includes an ink film formed on a recording medium with the ink of the present embodiment. The recorded matter can be obtained by an inkjet recording device and an inkjet recording method.

Recording Device and Recording Method

The ink of the present embodiment can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

The recording device and the recording method respectively represent a device (ink applying device) capable of discharging ink, various processing fluids, etc. to a recording medium and a method of conducting recording on the recording medium utilizing the device. The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

When an infrared heater is used as the heating device and the drying device, at least a near-infrared irradiation device is provided. As the near-infrared irradiation device, a device is known including a halogen lamp and a reflection mirror. A near-infrared irradiation device is commercialized in which a halogen heater is incorporated into a reflection mirror to form a heating unit for efficient heating.

Specific examples include, but are not limited to, UH-USC-CL300, UHUSC-CL700, UH-USC-CL1000, UH-US-CL300, UHUSD-CL700, UH-USD-CL1000, UH-MA1-CL300, UHMA1-CL700, and UH-MA1-CL1000 (all manufactured by USHIO INC.).

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 1:
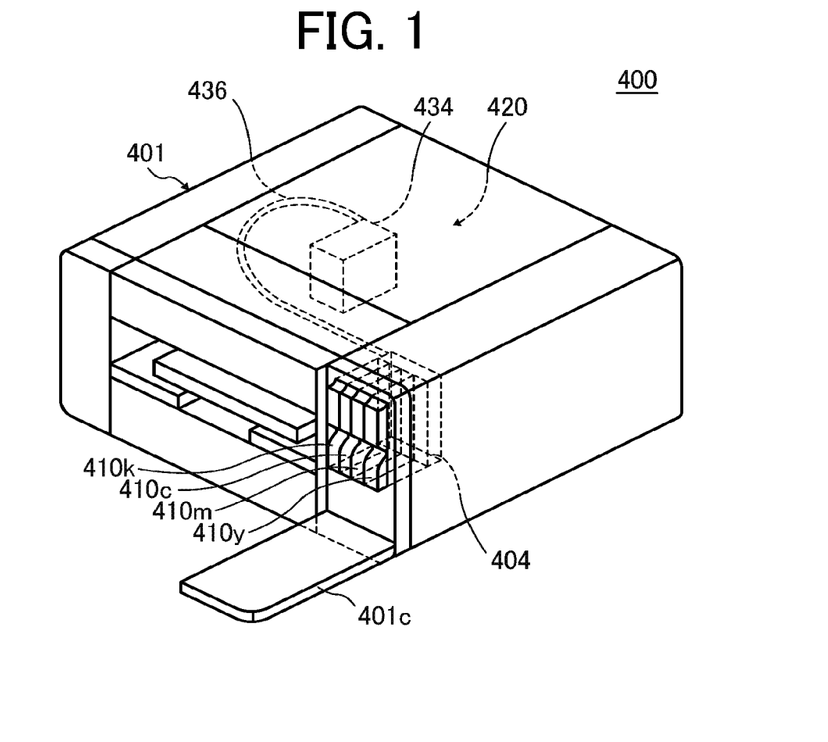
FIG. 1 is a diagram illustrating a perspective view of an example of a recording device.
Figure 2:
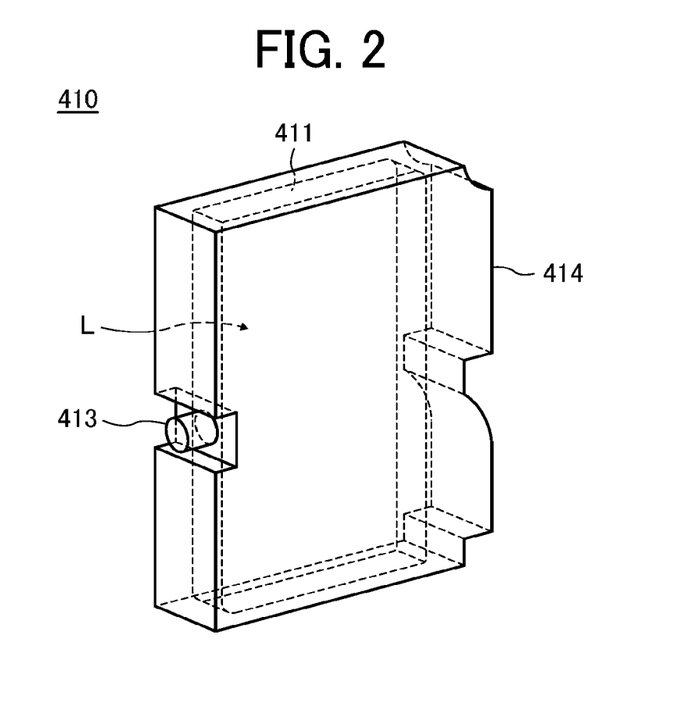
FIG. 2 is a diagram illustrating a perspective view of an example of a tank of a recording device.

The recording device is described using an example with reference to FIG. 1 and FIG. 2. FIG. 1 is a diagram illustrating a perspective view of the recording device. FIG. 2 is a diagram illustrating a perspective view of a tank. An image forming device 400 as an embodiment of the recording device is a serial type image forming device. An assembly unit 420 is disposed inside an exterior 401 of the image forming device 400. Each ink accommodating unit (ink container) 411 of each tank 410 (410k, 410c, 410m, and 410y) for each color of black (K), cyan (C), magenta (M), and yellow (Y) is made of a packaging material such as aluminum laminate film. The ink accommodating unit 411 is housed in, for example, a plastic container housing unit 414. As a result, the tank 410 is used as an ink cartridge of each color. The reference L means liquid in the tank.

A cartridge holder 404 is disposed on the rear side of the opening appearing when a cover 401c is opened. The tank 410 is detachably attached to the cartridge holder 404. This enables each ink outlet 413 of the tank 410 to communicate with a discharging head 434 for each color via a supplying tube 436 for each color so as to discharge the ink from a discharging head 434 to a recording medium.

Notably, the ink is applicable not only to the inkjet recording method but can be widely applied in other methods.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation of Pigment Dispersion

After preliminarily mixing the following recipe, the mixture was subject to circulation dispersion for seven hours with a disk type bead mill (KDL type, media: zirconia ball having a diameter of 0.3 mm, manufactured by SHINMARU ENTERPRISES CORPORATION) to obtain a self-dispersible black pigment dispersion (concentration of pigment solid portion: 15 percent by mass).

Carbon black pigment (Product: Monarch 800, manufactured by Cabot Corporation): 15.0 parts
Anionic surfactant (Product: Pionine A-51-B, manufactured by TAKEMOTO OIL & FAT Co., Ltd.): 2.0 parts
Deionized water: 83.0 parts Preparation of Ink

Example 1

With the following formulation, deionized water was added to the following formulation so as to make the total 100 parts. Subsequent to prescription followed by mixing and stirring, the resulting mixture was filtered with a 5 μm filter (manufactured by Sartorius Stedim Biotech GmbH) to obtain the ink of Example 1.

Pigment dispersion: 15.0 parts (pigment solids content: 2.3 parts)
SUPERFLEX® 300 (polyurethane-based resin particle, resin solids concentration: 30 percent by mass, manufactured by Daiichi Kogyo Seiyaku Co., Ltd.): 26.6 parts (resin solids content: 8.0 parts)
KF-353 (siloxane-based surfactant, HLB value=10, manufactured by Shin-Etsu Chemical Co., Ltd.): 1.0 part
1,2-propane diol: 10.0 parts
1,3-propane diol: 5.0 parts
3-methoxy-N,N-dimethyl propionamide: 5.0 parts
Diethylene glycol diethyl ether: 6.0 parts
3-methoxy-3-methyl butanol: 4.0 parts
PROXEL LV (Avecia Inkjet Limited): 0.1 parts
Deionized water: Balance Examples 2 to 8 and Comparative Examples 1 to 3

The inks of Examples 2 to 8 and Comparative Examples 1 to 3 were prepared in the same manner as the ink of Example 1 based on the formulations shown in Table 1. In Table 1, each numerical value represents the total amount of each component, and the numerical value in parentheses represents the solid content of each component. The unit of each numerical value is parts by mass.

In addition, the following materials were used for each component in Table 1.

J-450 (styrene acrylic resin particle, resin solids concentration: 42 percent by mass, manufactured by Johnson Polymer)
Zonyl FS300: Fluorochemical surfactant

TABLE 1

| Ink composition | | Example | | | | | |
|---|---|---|---|---|---|---|---|
| | | 1 | 2 | 3 | 4 | 5 | 6 |
| Coloring material | Black pigment liquid dispersion (Pigment solids concentration: 15 percent by mass) | 15.0 (2.3) | 15.0 (2.3) | 15.0 (2.3) | 15.0 (2.3) | 15.0 (2.3) | 15.0 (2.3) |
| Resin | Polyurethane resin Super flex 300 (Resin solids content concentration: 30 percent by mass) | 26.6 (8.0) | 16.7 (5.0) | 10.0 (3.0) | 30.0 (9.0) | 40.0 (12.0) | 26.6 (8.0) |
| | Styrene acrylic resin J-450 (Resin solids content concentration: 42 percent by mass) | | | | | | |
| Surfactant | KF-353 siloxane surfactant | 1.0 | 2.0 | 2.0 | 1.0 | 1.0 | 1.0 |
| | FS300, fluorochemical surfactant | | | | | | |
| Solvent | 1,2-propanediol | 10.0 | 10.0 | 10.0 | 10.0 | 10.0 | 10.0 |
| | 1,3-butanediol | 5.0 | 5.0 | 5.0 | 5.0 | 5.0 | 8.0 |
| | 3-methoxy-N,N-dimethyl propionamide | 5.0 | 5.0 | 5.0 | 5.0 | 5.0 | |
| | Diethylene glycol diethyl ether | 6.0 | 10.0 | 20.0 | 6.0 | 6.0 | 6.0 |
| | 3-methoxy-3-methylbutanol | 4.0 | | | 4.0 | 4.0 | 6.0 |

TABLE 1-continued

| | | | | | | | |
|---|---|---|---|---|---|---|---|
| Additive | PROXEL LV | 0.1 | 0.1 | 0.1 | 0.1 | 0.1 | 0.1 |
| | Highly pure water | Balance | Balance | Balance | Balance | Balance | Balance |
| | Total amount | 100 | 100 | 100 | 100 | 100 | 100 |

| | | Example | | Comparative Example | | |
|---|---|---|---|---|---|---|
| Ink composition | | 7 | 8 | 1 | 2 | 3 |
| Coloring material | Black pigment liquid dispersion (Pigment solids concentration: 15 percent by mass) | 15.0 (2.3) | 15.0 (2.3) | 15.0 (2.3) | 15.0 (2.3) | 15.0 (2.3) |
| Resin | Polyurethane resin Super flex 300 (Resin solids content concentration: 30 percent by mass) | 26.6 (8.0) | 26.6 (8.0) | 26.6 (8.0) | | 26.6 (8.0) |
| | Styrene acrylic resin J-450 (Resin solids content concentration: 42 percent by mass) | | | | 11.9 (4.5) | |
| Surfactant | KF-353 siloxane surfactant | 0.8 | 2.2 | | 1.0 | 1.0 |
| | FS300, fluorochemical surfactant | | | 1.0 | | |
| Solvent | 1,2-propanediol | 10.0 | 10.0 | 10 | 10.0 | 10.0 |
| | 1,3-butanediol | 5.0 | 5.0 | 5.0 | 5.0 | 5.0 |
| | 3-methoxy-N,N-dimethyl propionamide | 5.0 | 5.0 | 5.0 | 5.0 | 5.0 |
| | Diethylene glycol diethyl ether | 6.0 | 6.0 | 6.0 | 6.0 | 5.0 |
| | 3-methoxy-3-methylbutanol | 4.0 | 4.0 | 4 | 4 | 5.0 |
| Additive | PROXEL LV | 0.1 | 0.11 | 0.1 | 0.1 | 0.1 |
| | Highly pure water | Balance | Balance | Balance | Balance | Balance |
| | Total amount | 100 | 100 | 100 | 100 | 100 |

Using the thus-obtained ink, scratch resistance, beading, image gloss, and attachability were evaluated. The results are shown in Table 2.

Forming of Solid Image

An inkjet printer (remodeled based on IPSiO GXe5500, manufactured by Ricoh Company Ltd.) was filled with the adjusted ink and recorded a solid image on a recording medium of polyvinylchloride film (CPPVWP1300, manufactured by SAKURAI CO., LTD., hereinafter also referred to as PVC film) in an ink attachment amount of 0.6 g/cm². After recording, the solid image was dried for one hour on a hot plate (NINOS ND-1, manufactured by AS ONE Corporation.) set at 80 degrees C.

The IPSiO GXe5500 remodeled machine was remodeled based on the IPSiO GXe5500 in such a manner that recording corresponding to a print width of 150 cm and a recording speed of 30 m²/hr was made reproducible on A4 size. The hot plate was also installed onto the IPSiO GXe5500 remodeled machine so as to change the heating conditions (heating temperature and heating time) after recording.

Scratch Resistance

The solid image formed on the PVC film recording medium was rubbed 10 times with a cotton cloth and the degree of pigment transfer to the cotton cloth was visually checked and evaluated according to the following evaluation criteria. Grade B and above in the evaluation are preferable.

Evaluation Criteria
A: Pigment was minimally transferred to cotton cloth
B: Pigment was slightly transferred to cotton cloth
C: Pigment was clearly transferred to cotton cloth Beading Uneven recording of the solid image formed on the PVC film recording medium was visually checked to evaluate beading according to the following evaluation criteria. Grade B and above in the evaluation are preferable in terms of practical use.

Evaluation Criteria
A: Excellent (No beading present at all)
B: Good (Beading slightly present)
C: Fair (Beading present)
D: Poor (Beading significantly present)

Image Gloss

Gloss degree at 60° of a solid image formed on the PVC film recording medium was measured by a gloss meter (4501, manufactured by BYK Gardener) four times to calculate the average of the gloss value to evaluate image gloss according to the following evaluation criteria. Grade B and above in the evaluation are preferable.

Evaluation Criteria
AA: Gloss value is 100 or greater
A: Gloss value is 90 to less than 100
B: Gloss value is 80 to less than 90
C: Gloss value is less than 80

Attachability

A solid image was formed in the same manner as the formation of the solid image described above except that a PP film recording medium (P2161, manufactured by TOYOBO CO., LTD.) was used instead of the PVC film recording medium. According to the grid peeling test using a cloth adhesive tape (123 LW-50, manufactured by Nichiban Co., Ltd.) for the solid image after heating, the remaining number of grids in the 100 test grids was counted to evaluate attachability to recording medium based on the following evaluation criteria. Grade B and above in the evaluation are preferable in terms of practical use.

Evaluation Criteria
AA: Number of remaining grids is 98 or greater
A: Number of remaining grids was 90 to less than 98
B: Number of remaining grids is 70 to less than 90
C: Number of remaining grids of less than 70

TABLE 2

|  |  | Evaluation result | | | |
|---|---|---|---|---|---|
|  |  | Scratch resistance | Beading | Image gloss | Attachability |
| Example | 1 | A | A | AA | AA |
|  | 2 | A | A | AA | AA |
|  | 3 | A | A | AA | AA |
|  | 4 | A | A | A | AA |
|  | 5 | A | A | A | AA |
|  | 6 | A | B | AA | AA |
|  | 7 | A | A | A | AA |
|  | 8 | A | B | A | A |
| Comparative Example | 1 | A | C | B | A |
|  | 2 | B | B | A | C |
|  | 3 | A | C | B | A |

Examples 1, 2, and 3 are preferable embodiments of the present disclosure. As seen in the results, attachability and anti-beading are excellent. High image gloss are also obtained when the solid image was printed on a non-permeable recording medium. Moreover, the obtained image has good scratch resistance.

In Examples 4 and 5, the resin solids proportion was 8.0 percent or greater by mass. The results are inferior to those in Examples 1 and 2 with regard to image gloss.

The compound represented by Chemical formula 1 was not contained in Example 6. It was inferior to Examples 1 and 2 with regard to beading.

In Example 7, the addition amount of the siloxane compound (siloxane surfactant) was slightly small. It was inferior to Examples 1 and 2 regarding image gloss.

In Example 8, the addition amount of the siloxane compound (siloxane surfactant) was slightly large. It was inferior to Examples 1 and 2 regarding attachability and beading.

No siloxane compound (siloxane-based surfactant) was contained in Comparative Example 1. It was inferior to Examples regarding beading and image gloss.

No urethane resin was used in Comparative Example 2. It was inferior to Examples regarding attachability and scratch resistance.

The proportion of the addition amount of diethylene glycol diethyl ether was less than 6 percent in Comparative Example 3. It was inferior to Examples regarding beading and image gloss.

Judging from the evaluation results shown in Table 2, the ink of the present disclosure is found to be suitable for outdoor use. Further, the inks of Examples 1 to 6 were superior to Comparative Examples regarding beading and attachability.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink, comprising:
   a coloring material;
   a urethane resin;
   diethylene glycol diethyl ether; and
   a siloxane compound,
   wherein the diethylene glycol diethyl ether has a proportion of 6.0 to 20 percent by mass of a total amount of the ink.

2. The ink according to claim 1, wherein the urethane resin has a proportion of 8.0 percent or less by mass of a total amount of the ink.

3. The ink according to claim 1, further comprising a compound represented by the following Chemical formula 1, Chemical formula 1 wherein $R_1$, $R_2$, and $R_3$ each independently represent hydrocarbon groups having 1 to 8 carbon atoms.

4. The ink according to claim 1, wherein the siloxane compound has a proportion of from 1.0 to 2.0 percent by mass of a total amount of the ink.

5. The ink according to claim 1, wherein a mass ratio of an amount of diethylene glycol diethyl ether to an amount of the siloxane compound is from 2.7 to 10.0.

6. An ink accommodating container, comprising:
   the ink of claim 1; and
   an ink container containing the ink.

7. A recording device, comprising:
   the ink accommodating container of claim 6; and
   an ink applying device configured to apply the ink in the ink accommodating container.

8. The recording device according to claim 7, wherein the ink applying device applies the ink to a non-permeable substrate.

9. A recording method, comprising:
applying the ink of claim 1.

10. The ink according to claim 3, wherein the compound represented by Chemical formula 1 is 3-methoxy-N,N-dimethyl propionamide or 3-butoxy-N,N-dimethyl propionamide.

11. The ink according to claim 10, comprising 1.0 to 10.0 percent by mass of the compound represented by Chemical formula 1.

12. The ink according to claim 1, wherein the urethane resin has a proportion of 5.0 to 12.0 percent by mass of a total amount of the ink.

13. The ink according to claim 1, wherein the siloxane compound comprises a siloxane surfactant and has a proportion of from 0.1 to 4.0 percent by mass of a total amount of the ink.

14. The ink according to claim 13, wherein a mass ratio of an amount of diethylene glycol diethyl ether to an amount of the siloxane compound is from 2.7 to 10.0.

15. The ink according to claim 14, wherein the urethane resin has a proportion of 5.0 to 12.0 percent by mass of a total amount of the ink.

\* \* \* \* \*